United States Patent
Chen et al.

(10) Patent No.: US 8,614,889 B2
(45) Date of Patent: Dec. 24, 2013

(54) COMPUTER ENCLOSURE

(75) Inventors: Yun-Lung Chen, Tu-Cheng (TW); Da-Long Sun, Shenzhen (CN); Jun-Pu Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 288 days.

(21) Appl. No.: 13/076,312

(22) Filed: Mar. 30, 2011

(65) Prior Publication Data

US 2012/0026685 A1 Feb. 2, 2012

(51) Int. Cl.
*G06F 1/16* (2006.01)
*G06F 1/18* (2006.01)

(52) U.S. Cl.
CPC ...................................... *G06F 1/188* (2013.01)
USPC .................... 361/679.6; 361/679.02

(58) Field of Classification Search
USPC ......................................... 361/679.02, 679.6
See application file for complete search history.

(56) References Cited

U.S. PATENT DOCUMENTS

| | | | |
|---|---|---|---|
| 6,229,696 B1 * | 5/2001 | Lin et al. ................... | 361/679.58 |
| 6,270,046 B1 * | 8/2001 | Liu et al. .................... | 248/231.9 |
| 6,288,332 B1 * | 9/2001 | Liu et al. ........................ | 174/542 |
| 6,288,901 B1 * | 9/2001 | Liu et al. ........................ | 361/724 |
| 6,386,656 B1 * | 5/2002 | Chen .......................... | 312/223.2 |
| D465,453 S * | 11/2002 | Chan .......................... | D13/110 |
| 6,530,551 B2 * | 3/2003 | Gan .............................. | 248/694 |
| 6,530,628 B1 * | 3/2003 | Huang et al. ............... | 312/223.2 |
| 6,685,503 B1 * | 2/2004 | Huang et al. .................. | 439/527 |
| 6,751,100 B2 * | 6/2004 | Chen .............................. | 361/725 |
| 6,816,367 B2 * | 11/2004 | Liu et al. .................. | 361/679.33 |
| 7,046,517 B2 * | 5/2006 | Long et al. ..................... | 361/725 |
| 7,123,469 B2 * | 10/2006 | Chen et al. .................... | 361/601 |
| 7,142,431 B2 * | 11/2006 | Li et al. ......................... | 361/726 |
| 7,200,004 B2 * | 4/2007 | Chen et al. ............... | 361/679.39 |
| 7,206,197 B2 * | 4/2007 | Chen et al. ............... | 361/679.02 |
| 7,303,434 B1 * | 12/2007 | Chen et al. ..................... | 439/557 |
| 7,327,567 B2 * | 2/2008 | Chen et al. ............... | 361/679.41 |
| 7,443,662 B2 * | 10/2008 | Chen et al. ............... | 361/679.55 |
| 7,548,416 B2 * | 6/2009 | Lin et al. .................. | 361/679.33 |
| 7,715,177 B2 * | 5/2010 | Chen et al. ............... | 361/679.01 |
| 7,894,193 B2 * | 2/2011 | Lai et al. ........................ | 361/724 |
| 2003/0193782 A1 * | 10/2003 | Chen ............................. | 361/726 |
| 2005/0111169 A1 * | 5/2005 | Chen et al. .................... | 361/679 |
| 2005/0122673 A1 * | 6/2005 | Chen et al. .................... | 361/683 |
| 2007/0139902 A1 * | 6/2007 | Chen et al. .................... | 361/796 |
| 2007/0285882 A1 * | 12/2007 | Chen ............................. | 361/683 |
| 2008/0130217 A1 * | 6/2008 | Chen ............................. | 361/685 |
| 2008/0253076 A1 * | 10/2008 | Chen ............................. | 361/684 |
| 2011/0043986 A1 * | 2/2011 | Conn et al. ............... | 361/679.02 |
| 2012/0008285 A1 * | 1/2012 | Renkel et al. .................. | 361/724 |
| 2012/0033358 A1 * | 2/2012 | Chen et al. ............... | 361/679.01 |

* cited by examiner

*Primary Examiner* — Adrian S Wilson
(74) *Attorney, Agent, or Firm* — Altis Law Group, Inc.

(57) ABSTRACT

A computer enclosure includes a rear panel and a lifting member. An opening is defined in the rear panel. The lifting member is mounted to the rear panel. The lifting member includes a handle portion and a first mounting bracket connected to the handle portion. The handle portion includes a lifting plate. The first mounting bracket includes a first rear mounting portion mounted to the rear panel. The lifting plate is accessible through the opening from an outside of the rear panel.

15 Claims, 6 Drawing Sheets

COMPUTER ENCLOSURE

BACKGROUND

1. Technical Field

The present disclosure relates to computer enclosures, especially to a computer enclosure with a handle portion.

2. Description of Related Art

There are frequent occasions when a user must carry a notebook computer or a personal computer from one place to another. However, the personal computer usually has large volume, is heavy, and has a smooth or planar enclosure for good appearance. It is hard to grip it from the outside of the enclosure. Therefore, an easily carried computer enclosure is needed.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
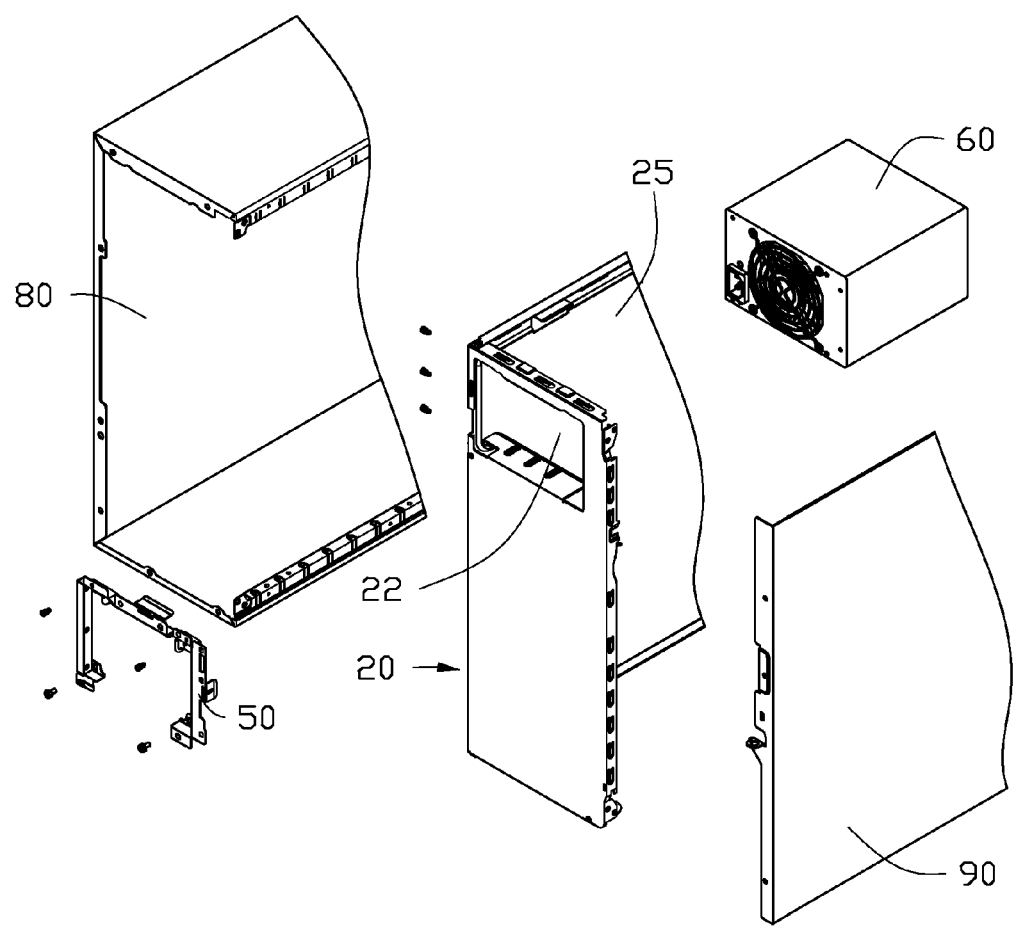
FIG. 1 is a partial, exploded, isometric view of an embodiment of a computer enclosure.
Figure 2:
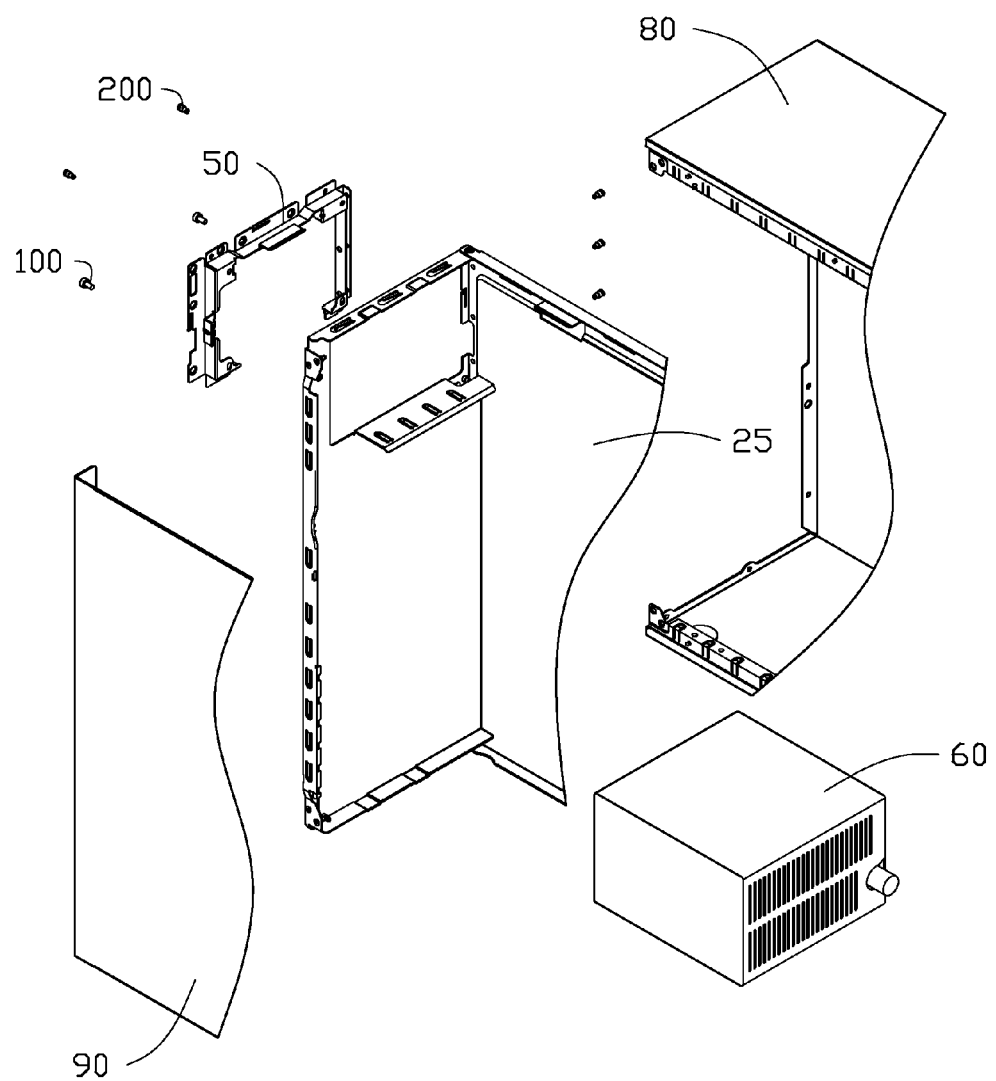
FIG. 2 is similar to FIG. 1, but from another aspect.

Referring to FIG. 1 and FIG. 2, an embodiment of a computer enclosure includes a rear panel 20, a base board 25 perpendicular to the rear panel 20, a lifting member 50, a power supply 60, a shell 80 and a side panel 90. A rectangular opening 22 is defined in the rear panel 20 for receiving the power supply 60. The power supply 60 can extend through the opening 22.

Figure 3:
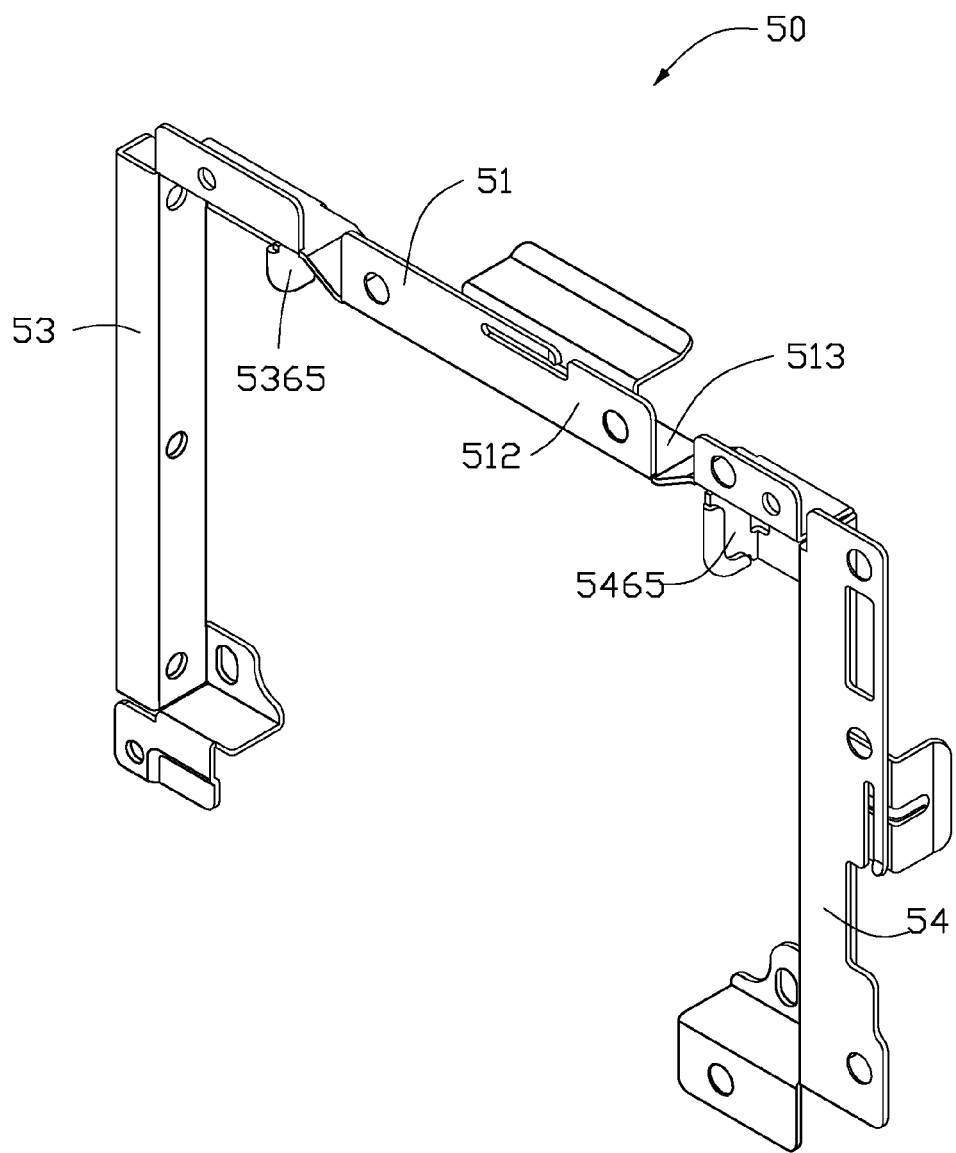
FIG. 3 is an enlarged view of the lifting member of FIG. 1.
Figure 4:
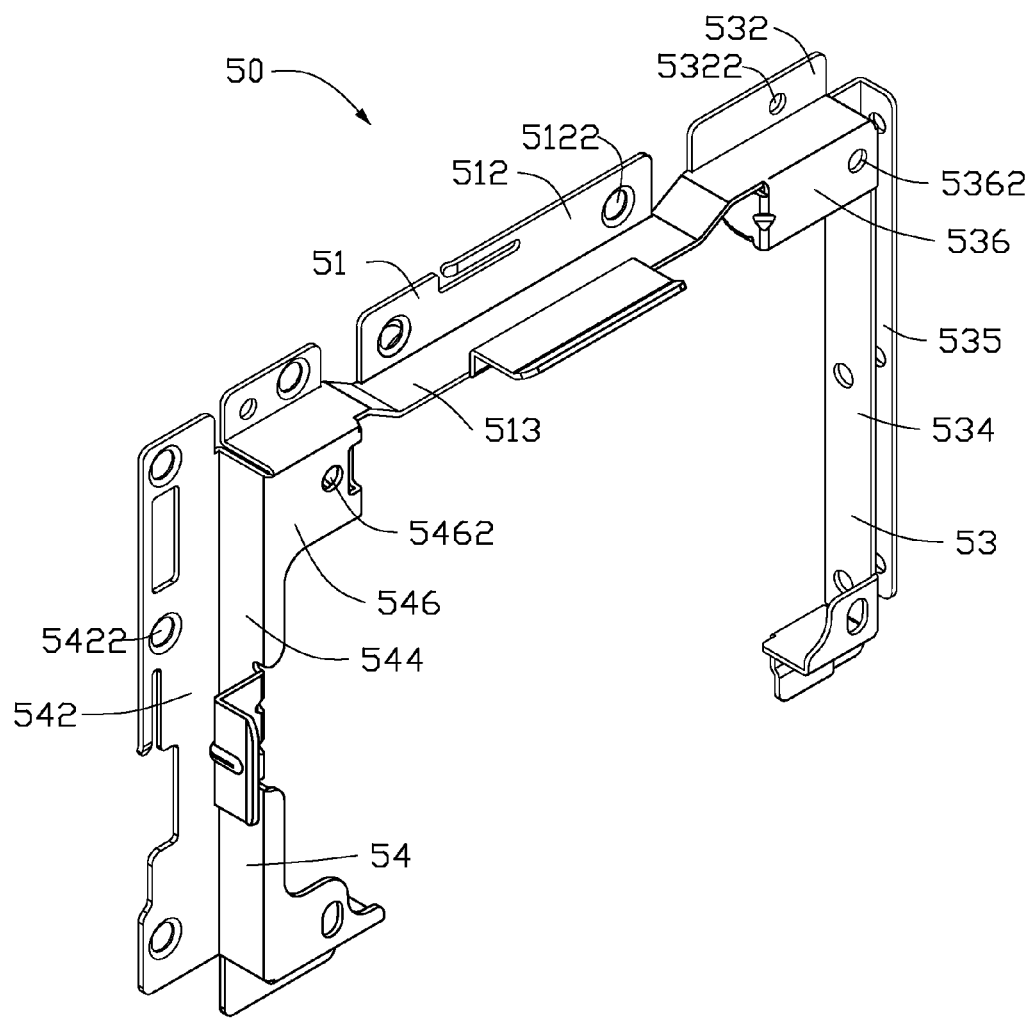
FIG. 4 is an enlarged view of the lifting member of FIG. 2.

Referring to FIG. 3 and FIG. 4, the lifting member 50 is located between the power supply 60 and the rear panel 20. The lifting member 50 can be substantially C-shaped. The lifting member 50 includes a handle portion 51, a first mounting bracket 53 connected to the handle portion 51, and a second mounting bracket 54 mounted to the handle portion 51. The first mounting bracket 53 and the second mounting bracket 54 are located at opposite sides of the handle portion 51. The handle portion 51 includes a mounting wall 512 and a lifting plate 513 perpendicular to the mounting wall 512. At least one mounting hole 5122 is defined in the mounting wall 512. The lifting plate 513 may be planer or recess configuration to facilitate lifting by hand.

The first mounting bracket 53 is substantially C-shaped. The first mounting bracket 53 includes a planar first rear mounting portion 532, two first connecting portions 534, 535 perpendicular to the first rear mounting portion 532, and a first fixing portion 536 for fixing the power supply 60. The two first connecting portions 534, 535 are spaced from each other. At least one of the mounting holes 5322, 5362 is defined in the first rear mounting portion 532 and the first fixing portion 536. A first stop portion 5365 is located on the first mounting bracket 53 at a side of the handle portion 51.

The second mounting bracket 54 can be generally C-shaped. The second mounting bracket 54 includes a planer second rear mounting portion 542, a second connecting portion 544 perpendicular to the second rear mounting portion 542, and a second fixing portion 546 for fixing the power supply 60. At least one of the mounting holes 5422, 5462 is defined in the second rear mounting portion 542 and the second fixing portion 546. A second stop portion 5465 is located on the second mounting bracket 54 at the opposite side of the first stop portion 5365.

Figure 5:
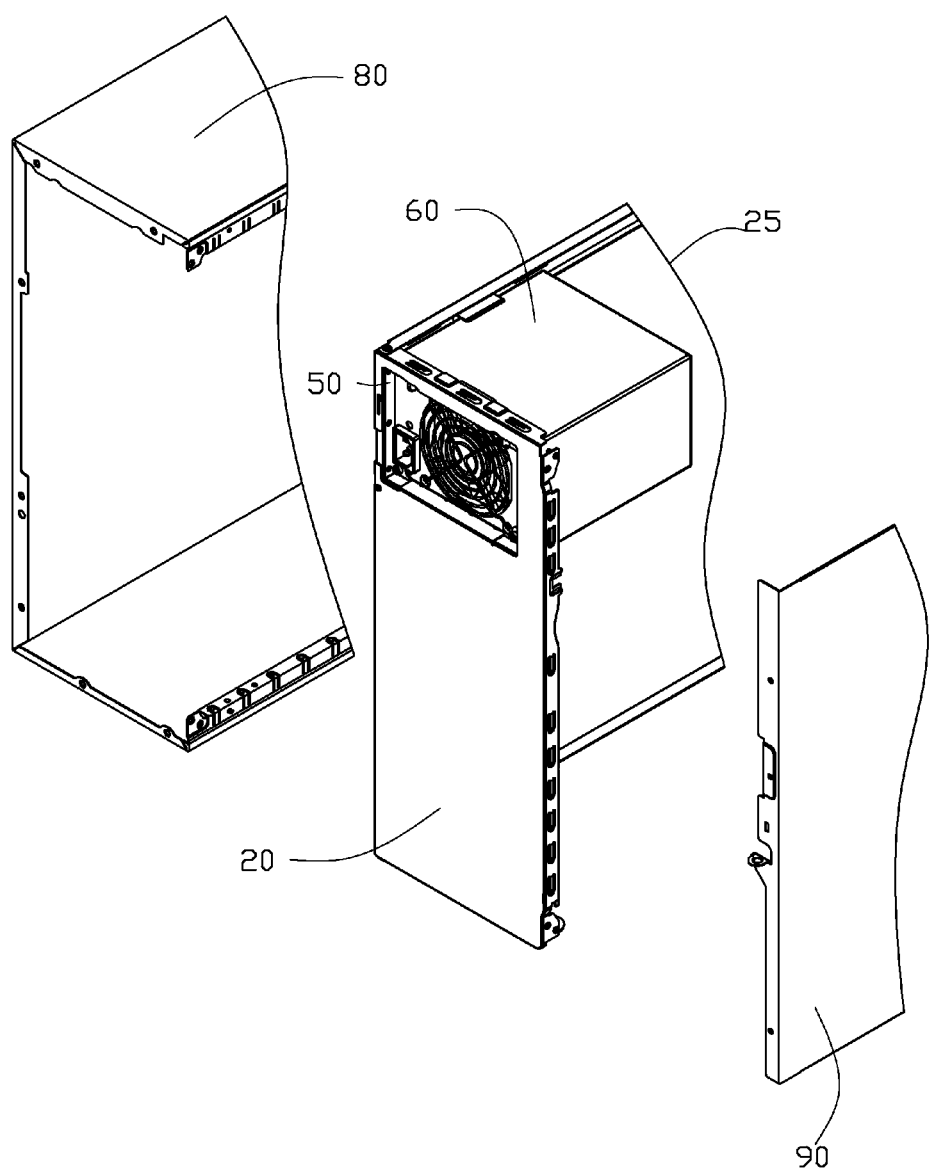
FIG. 5 is an assembled view of the rear panel, lifting member and the power supply of FIG. 1.

Referring to FIG. 5, in assembly, the lifting member 50 is positioned at an inner side of the rear panel 20. The mounting wall 512, the first rear mounting portion 532, and the second rear mounting portion 542 are fixed to the rear panel 20 with fasteners, such as screws 100. The power supply 60 is directly fixed to the first fixing portion 536 and the second fixing portion 546. In this state, the power supply 60 is fixed to the rear panel 20 through the lifting member 50. To stably fix the power supply 60 to the rear panel 20, the lifting member 50 may be further fixed to the base board 25 at the first mounting bracket 53. Other fixing methods can be used for fixing the power supply 60 and the lifting member 50, such as riveting.

After the lifting member 50 is fixed to the rear panel 20, the handle member 51 is located at inner side of the rear panel 20. The handle portion 51 is located at one side of the opening 22, and the first mounting bracket 53 and the second mounting bracket 54 are located at opposite sides of the opening 22. A lifting space is defined between the rear panel 20 and the power supply 60, the lifting space is further surrounded by the lifting plate 513, the first connecting portion 534 and the second connecting portion 544. The lifting space communicates with the opening 22.

Figure 6:
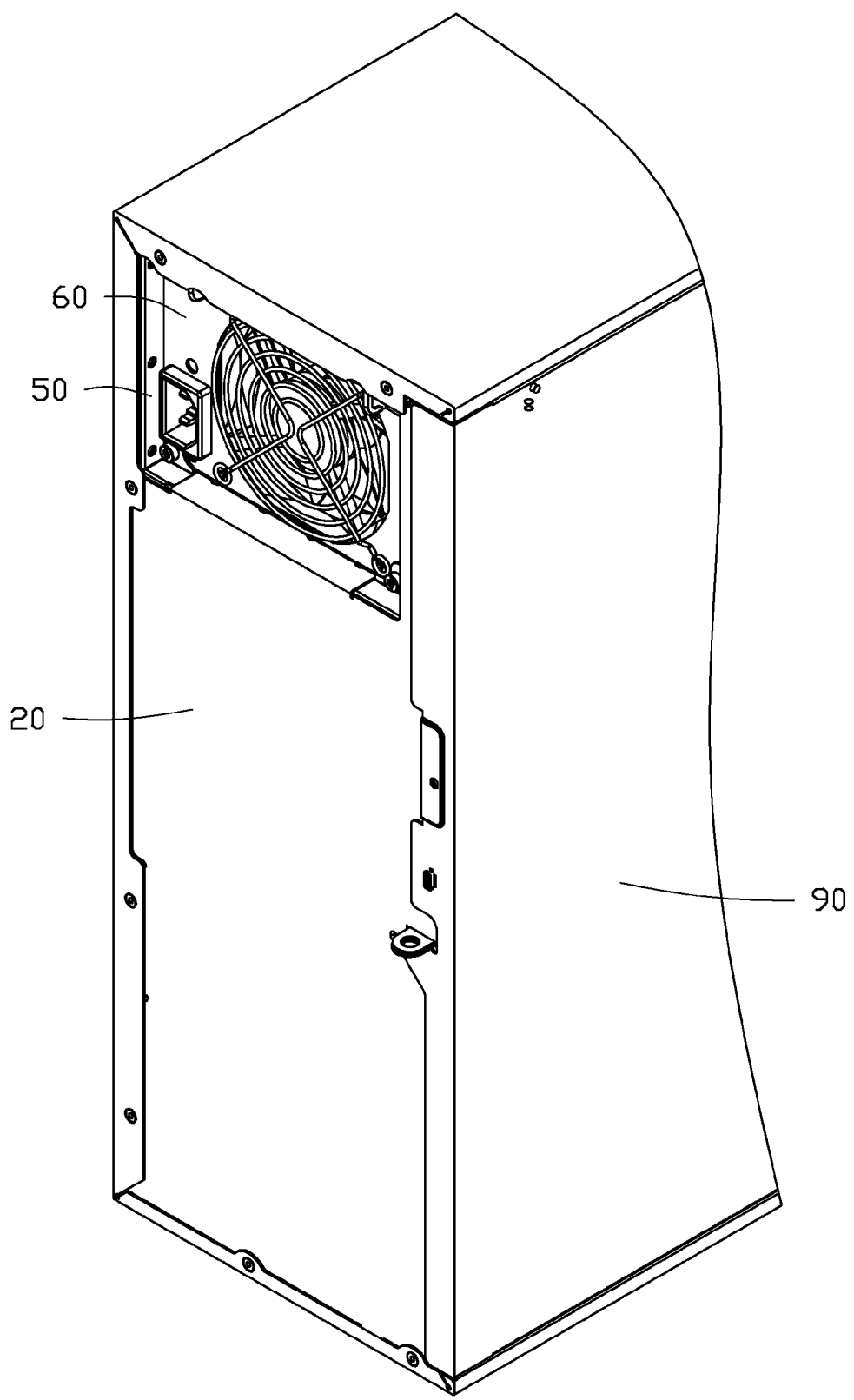
FIG. 6 is an assembled view of FIG. 1.

Referring to FIG. 6, the rear panel 20, the lifting member 50, and the power supply 60 are fixed inside the shell 80 and the side panel 90. In use, the user can grip the computer enclosure in the lifting space through the opening 22 with one hand. The first stop portion 5365 and the second stop portion 5465 can protect the hand from moving laterally.

In other embodiments, only one of the first mounting bracket 53 or the second mounting bracket 54 is employed.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
   a power supply;
   a rear panel;
   an opening defined in the rear panel; and
   a lifting member mounted to the rear panel, the lifting member located between the power supply and the rear panel, and the lifting member comprising a handle portion and a first mounting bracket connected to the handle portion, the handle portion comprising a lifting plate, and the first mounting bracket comprising a first rear mounting portion mounted to the rear panel and a first connecting portion;

a lifting space defined between the rear panel and the power supply for providing space for gripping the lifting member through the opening, the lifting space being surrounded by the first connecting portion and the lifting plate, and the lifting space communicates with the opening, wherein the lifting plate is accessible through the opening from an outside of the rear panel.

2. The computer enclosure of claim 1, wherein the lifting plate is planar and is located perpendicular to the rear panel.

3. The computer enclosure of claim 1, wherein a base board is connected to the rear panel, the rear panel is perpendicular to the base board, the first rear mounting portion is mounted to the rear panel, and the first connecting portion is mounted to the base board.

4. The computer enclosure of claim 1, wherein the first mounting bracket is C-shaped.

5. The computer enclosure of claim 1, wherein the lifting member further comprises a second mounting bracket, and the second mounting bracket and the first mounting bracket are located at opposite sides of the handle portion.

6. The computer enclosure of claim 5, wherein the opening is rectangular, the handle portion is mounted to the rear panel along the opening, and the first mounting bracket and the second mounting bracket are located at opposite sides of the opening.

7. The computer enclosure of claim 5, wherein a first stop portion is located on the first mounting bracket, and a second stop portion is located on the second mounting bracket, the first stop portion and the second stop portion are located at opposite sides of the lifting plate.

8. A computer enclosure comprising:

a rear panel, an opening defined in the rear panel;

a lifting member mounted to the rear panel, and the lifting member comprising a handle portion and a first mounting bracket connected to the handle portion, the handle portion comprising a lifting plate, the lifting plate is planar and located substantially perpendicular to the rear panel, and the first mounting bracket comprising a first rear mounting portion mounted to the rear panel; and a power supply mounted to the lifting member, wherein the power supply being configured to extend through the opening, and the lifting plate is accessible through the opening when the power supply is mounted to the rear panel.

9. The computer enclosure of claim 8, wherein the lifting member is located between the power supply and the rear panel.

10. The computer enclosure of claim 9, wherein the first mounting bracket comprises a first connecting portion, a lifting space is defined between the rear panel and the power supply, the lifting space is surrounded by the first connecting portion and the lifting plate, and the lifting space communicates with the opening.

11. The computer enclosure of claim 10, wherein a base board is connected to the rear panel, the rear panel is perpendicular to the base board, the first rear mounting portion is mounted to the rear panel, and the first connecting portion is mounted to the base board.

12. The computer enclosure of claim 8, wherein the first mounting bracket is C-shaped.

13. The computer enclosure of claim 8, wherein the lifting member further comprises a second mounting bracket, and the second mounting bracket and the first mounting bracket are located at opposite sides of the handle portion.

14. The computer enclosure of claim 13, wherein the opening is rectangle, the handle portion is mounted to the rear panel along the opening, and the first mounting bracket and the second mounting bracket are located at opposite sides of the opening.

15. The computer enclosure of claim 13, wherein a first stop portion is located on the first mounting bracket, and a second stop portion is located on the second mounting bracket, the first stop portion and the second stop portion are located at opposite sides of the lifting plate.

* * * * *